United States Patent [19]

Byun

[11] Patent Number: 5,118,082
[45] Date of Patent: Jun. 2, 1992

[54] ELECTRICALLY OPERATED SCREW-TYPE JACK

[75] Inventor: Dae-Soo Byun, Seoul, Rep. of Korea
[73] Assignee: B & L Corp., Rep. of Korea
[21] Appl. No.: 688,980
[22] Filed: Apr. 22, 1991

[30] Foreign Application Priority Data

Jun. 28, 1990 [KR] Rep. of Korea .................. 9277

[51] Int. Cl.⁵ ............................................. B66F 3/10
[52] U.S. Cl. ..................................... 254/102; 254/103
[58] Field of Search ............... 254/102, 103, DIG. 2, 254/98; 192/41 S, 8 C, 12 BA, 81 C, 56 C, 84 T

[56] References Cited

U.S. PATENT DOCUMENTS

| | | | |
|---|---|---|---|
| 1,600,597 | 9/1926 | Menyes | 254/DIG. 2 |
| 1,837,137 | 12/1931 | Schwerin | 254/103 |
| 3,244,401 | 4/1966 | Iimura | 254/103 |
| 3,458,173 | 7/1969 | Kornovich et al. | 254/103 |
| 4,609,179 | 9/1986 | Chern et al. | 254/102 |
| 4,623,051 | 11/1986 | Lochmoeller | 254/DIG. 2 |
| 4,653,727 | 3/1987 | Chang et al. | 254/DIG. 2 |

Primary Examiner—Robert C. Watson
Attorney, Agent, or Firm—Harrison & Egbert

[57] ABSTRACT

An electrically operated screw-type jack comprising a support base, a housing, a jack body, a lifting ram being contained in the jack body, a servo motor being contained in the housing, reduction gears for transmitting the driving power of the servo motor to the lifting ram, a safety device for preveting the servo motor and the power transmitting mechanism including the reduction gears from an abrupt failure in overloading the jack, and a square head pin for hand operation of the jack when there is an overload on the jack. The reduction gears consist of first sun and planet gears, second sun and planet gears and a sun gear cylinder. The safety device consists of a clutch disk, a clutch spring and a sleeve. The present invention can provide an electrically operated screw-type jack which can promote the driving power of the servo motor, and prevent its power elements from an abrupt failure when there is an overload thereon.

4 Claims, 5 Drawing Sheets

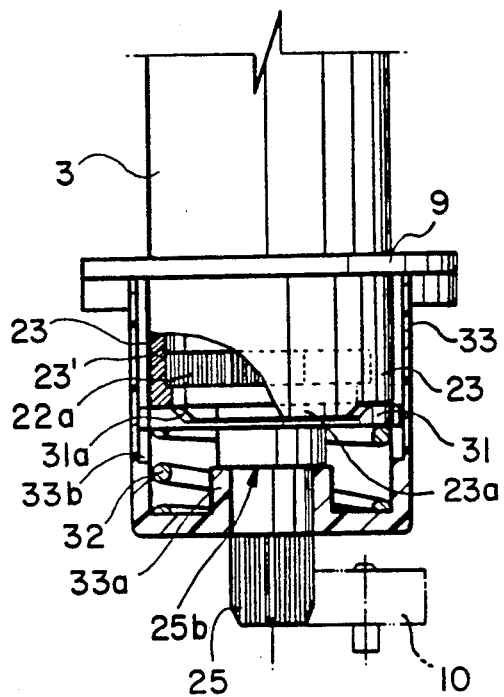
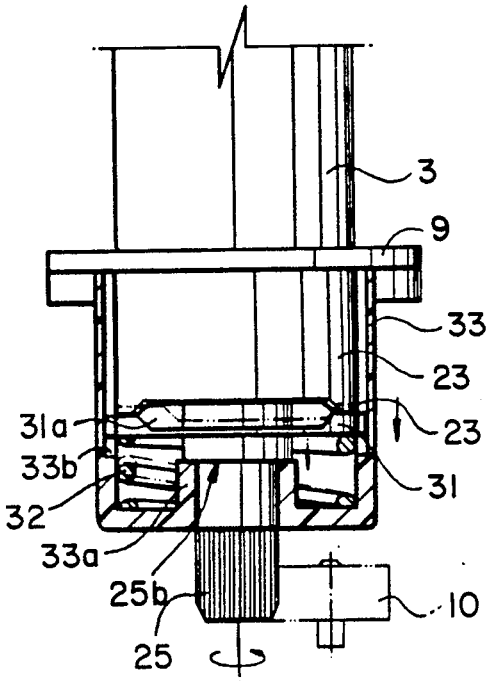
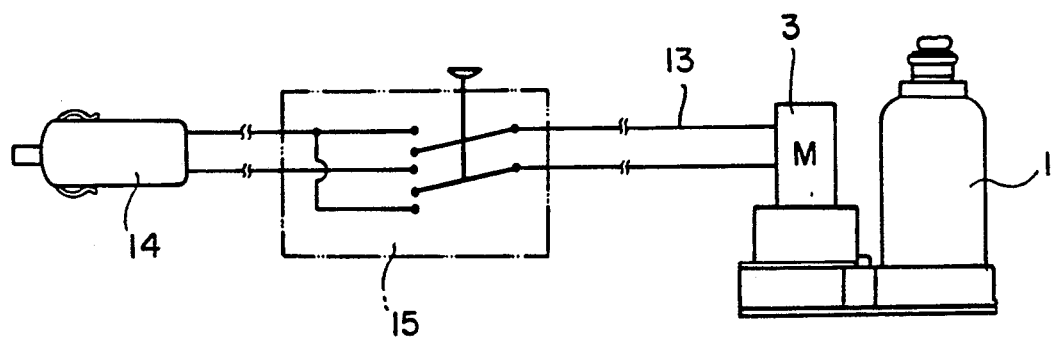

ELECTRICALLY OPERATED SCREW-TYPE JACK

BACKGROUND OF THE INVENTION

1. Field of The Invention

The present invention relates to a jack, and more particularly to a electrically operated screw-type jack. The present invention is an improvement made over the conventional hand-operated or electrically operated jacks used in working on vehicles.

2. Description of Prior Art

Conventional hand-operated jacks used in working on vehicles are operated by hands of a person. Since the person must stand near the load to be lifted while operating the jack, the jack can be unsafe. Furthermore, conventional jacks require too much time to lift the lifting ram. Since great power is required to operate conventional jacks, such jacks are not easily used by females or weak persons.

Therefore, there have been many attempts to solve the problems of the hitherto used hand-operated jacks. For example, U.S. Pat. No. 4,609,197 entitled "SCREW JACK" reveals an electrically operated screw-type jack as shown in accompanying drawing, FIG. 6.

As indicated in FIG. 6, the conventional electric screw-type jack generally consists of a jack body (a), a servo motor (b) mounted beside the jack body (a), a driving worm (c) and a worm wheel (d) interlocked with each other by the servo motor (b), and a lifting ram (f), being provided with a spur gear (e) fixedly mounted at the lowermost end thereof, which can move upward or downward depending on rotating directions of the servo motor (b). However, in the conventional electric screw-type jack, the power from the servo motor (b) is directly transmitted to the worm wheel (d) and the spur gear (e) without any addition of speed-reduction mechanism, so that the power transmitting parts, such as the driving worm (c), the worm wheel (d) and the spur gear (e) raise the contact resistance therebetween during the lifting of vehicles of relatively heavy weight. Therefore, the conventional electrically operated screw-type jack have some problems because of the repeated abrasion of the power transmitting parts, and more particularly when lifting heavy-industrial vehicles such as a dump truck and the like. There may be failures of the servo motor and the power transmitting parts as a result of the deficient power of the servo motor.

SUMMARY OF THE INVENTION

Accordingly, an object of this invention is to provide an improved electrically operated screw-type jack which can transfer sufficient power from the servo motor, so as to easily lift vehicles of heavy weight.

It is a further object of this invention to provide an improved electrically operated screw-type jack which are easy to use and simple to operate.

It is a further object of this invention to provide an improved electrically operated screw-type jack which can provide a safe operation when lifting vehicles.

It is a still further object of this invention to provide an electrically operated screw-type jack with reduction gears.

It is a still further object of this invention to provide an electrically operated screw-type jack with a safety device.

In accordance with the present invention, there is provided a electrically operated screw-type jack comprising a support base, a jack body mounted on said support base, a housing mounted beside said jack body and having a diaphragm formed at a middle portion thereof, a servo motor having a driving gear mounted to a lower end thereof, the driving gear being contained in said housing, a lifting ram vertically mounted on said support base and being contained in said jack body, a driven gear and a driven pinion mounted on said support base, and integrally formed with each other, reduction gears having first sun and planet gears including first planetary gears and a center gear, second sun and planet gears including second planetary gears and a driving pinion, a sun gear cylinder housing having said first and second sun and planet gears therein and with fitting projections formed at lower end thereof, a safety device mounted under said reduction gears and having a clutch disk on which are formed fitting recesses and fitting protrusions, a clutch spring, a sleeve mounted detachably to said diaphragm of the housing by bolts and being provided with guide grooves formed on the inner surface thereof, and a cylindrical support formed upward at the bottom thereof and housing said reduction gears and said safety device therein. The present exemplary embodiments will be described in datail with reference to the accompanying drawings.

BRIEF DESCRIPTION OF THE DRAWINGS

FIGS. 4 are fragmentary views showing the operating conditions of the screw-type jack, in which:

FIG. 4A is a fragmentary view showing a condition before operating the jack; and FIG. 4B is a fragmentary view showing a condition after operating the jack;

FIG. 5 is a schematic electrical wiring diagram for the screw-type jack of FIG. 1.

DETAILED DESCRIPTION OF THE PREFERRED EMBODIMENTS

Figure 1:
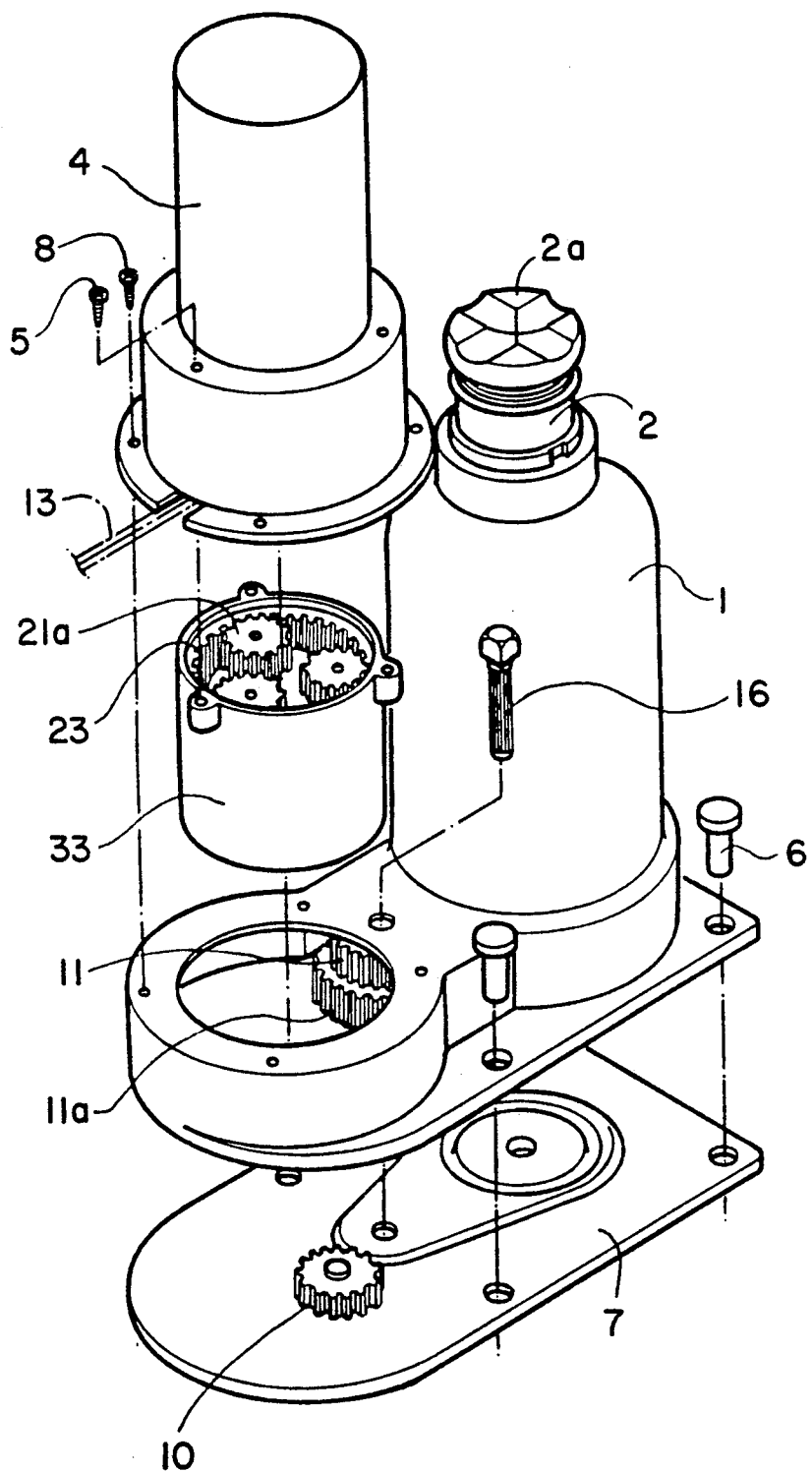
FIG. 1 is an exploded-perspective view of an electrically operated screw-type jack embodying the present invention.
Figure 2:
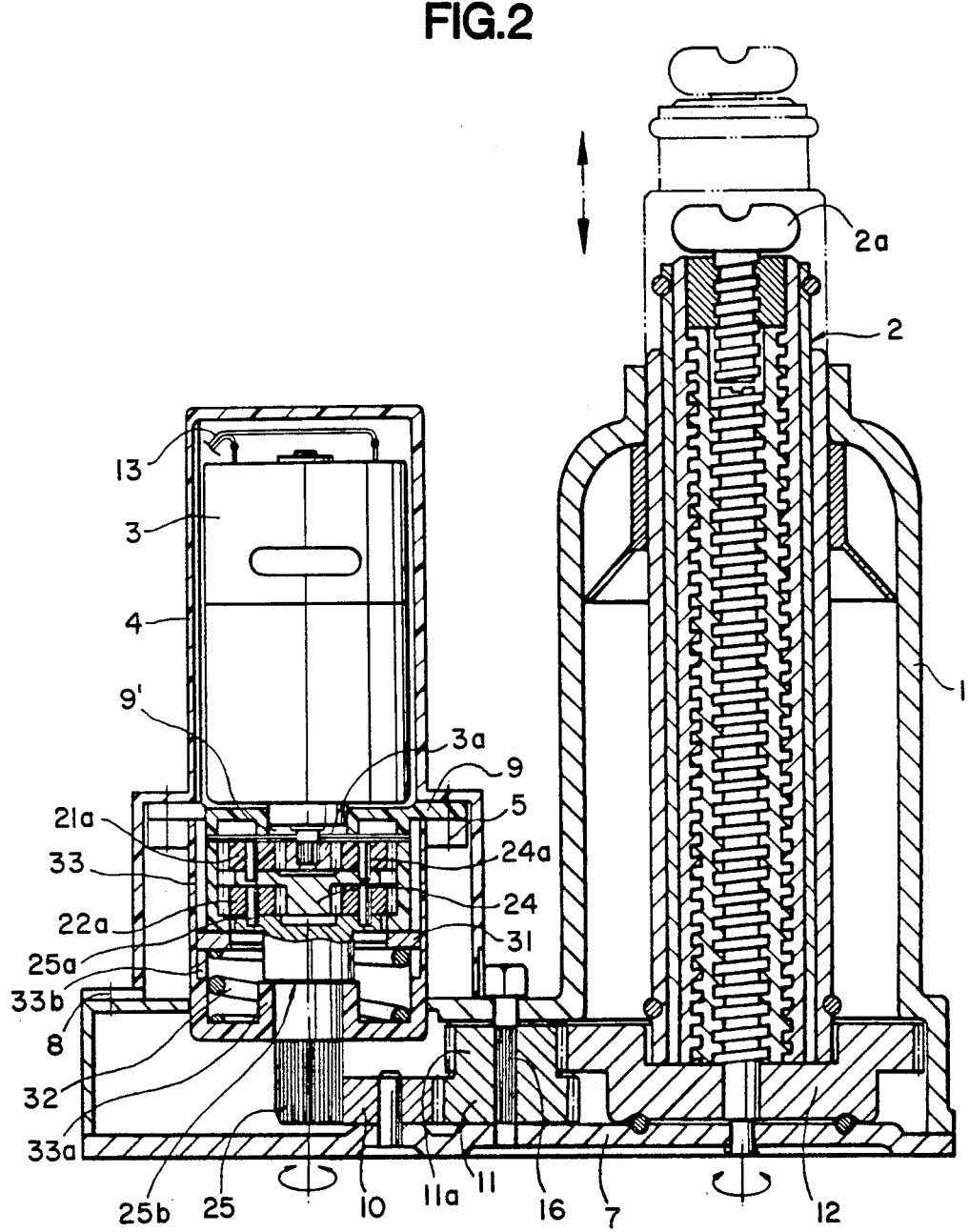
FIG. 2 is on cross-sectional elevational view of the screw-type jack of FIG. 1.
Figure 3:
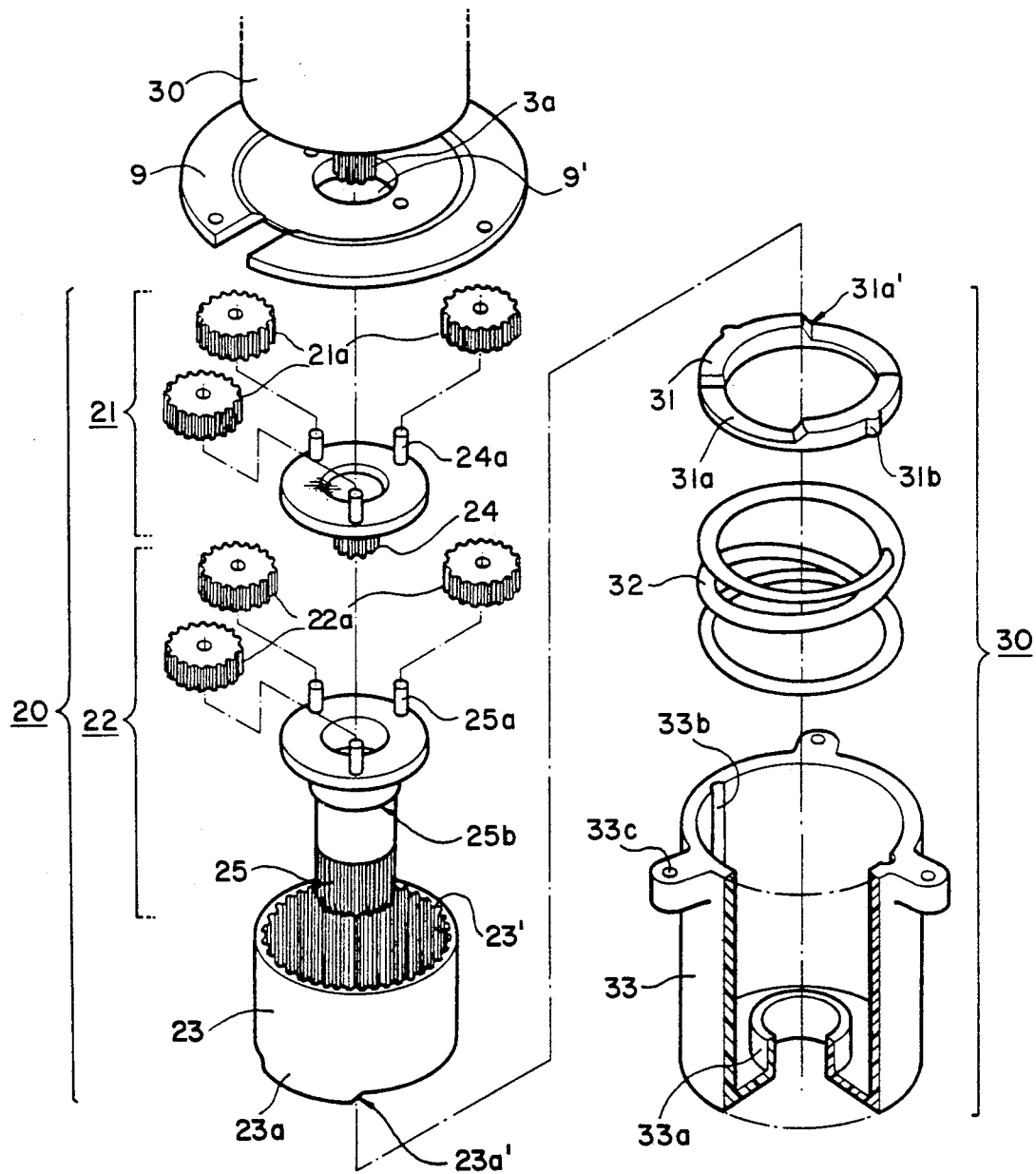
FIG. 3 is a fragmentary-exploded perspective view showing reduction gears and safety device of the screw-type jack of FIG. 1.
Figure 6:
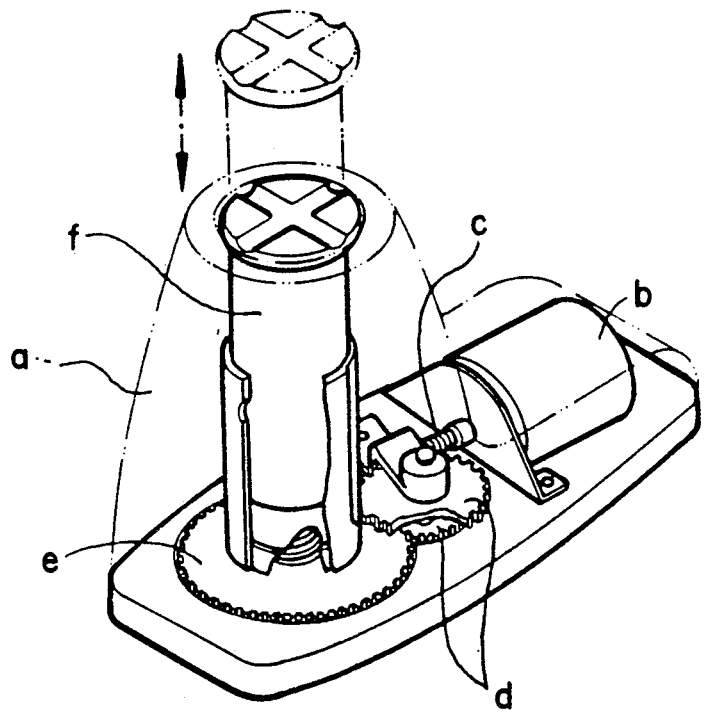
FIG. 6 is an exploded-perspective view of a conventional electrically operated screw-type jack.

With reference now to the drawings, there is shown in FIG. 1 an exploded-perspective view of a electrically operated screw-type jack which includes a jack body housing 1 which contains a spiral lifting ram 2 therein, a housing 4 which contains reduction gears 20 (as shown in detail in FIG. 3) and a servo motor 3 (shown in FIG. 2) and a safety device 30 (shown in detail in FIG. 3 and is detachably mounted, by a plurality of bolts 8, to a support integrally formed with the jack body 1, and a support base 7 which is fixedly mounted under the jack body 1 by a plurality of rivets 6.

The reduction gears 20 are mounted in a sleeve 33 which is an element of the safety device 30 and mounted to a flange 9 of the housing 4 by a plurality of bolts 5. The reduction gears 20 and the safety device 30 are important elements in this screw-type jack.

As shown in FIG. 2 which is a cross-sectional elevational view of this screw-type jack, the reduction gears 20 consist of first sun and planet gears 21, second sun and planet gears 22 and a sun gear cylinder 23.

In FIG. 3, there is a fragmentary-exploded perspective view showing the reduction gears 20 and the safety device 30. The first sun and planet gears 21 consists of a plurality of first planetary gears 21a and a center gear 24 on which are formed several pins 24a for mounting the first planetary gears 21a thereon. The first planetary gears 21a gear into a driving gear 3a of the servo motor 3 which protrudes through a center opening 9' of the diaphragm 9. Also, the second sun and planet gears 22 consist of a plurality of second planetary gears 22a and a driving pinion 25 on which are formed several pins 25a for mounting the second planetary gears 22a thereon. The second planetary gears 22a gear into the center gear 24. The sun gear cylinder 23 consists of a cylinder of which top and bottom are open and the inner surface 23' is machined to function as a sun gear which gears into the first and second planetary gears 21a, 22a. At both diametrical sides of a lower end of the sun gear cylinder 23 are formed a pair of fitting projections 23a which are to be fitted with a hereinafter described clutch disk 31 of the safety device 30. Also, at both sides of the fitting projections 23a are formed slants 23a'.

Referring again to FIG. 2, the safety device 30 consists of a clutch disk 31, a clutch spring 32 and a sleeve 33 for housing the clutch disk 31 and the clutch spring 32.

With reference to the exploded view of FIG. 3, the clutch disk 31 is provided with a center opening, a pair of fitting recesses 31a and a pair of fitting protrusions 31b. The fitting recesses 31a are fitted with the fitting projections 23a, and provided with slants 31a' at both sides thereof.

The clutch spring 32 functions to keep the fitting projections 23a and the fitting recesses 31a in a fitting state therebetween in case of a normal operation of the jack or to make them break away from the fitting state in case of an abnormal operation.

The sleeve 33 is consists of a cylindrical case in which the reduction gears 20 and the safety device 30 are contained. Also, at a center of a bottom of the sleeve 33 is formed a cylindrical support 33a which can permit the driving pinion 25 of the reduction gears 20 to penetrate therethrough, and to seat a lower surface of the engaging flanged end 25b of the driving pinion 25 on its top end (see FIGS. 4). Also, at both diametrical portions inside the sleeve 33 are vertically formed a pair of guide grooves 33b for receiving the fitting protrusions 31b of the clutch disk 31 in order to guide the lifting movement of this jack. Furthermore around the top end of the sleeve 33, there is provided with a plurality of fixing holes 33c for mounting it to the flange 9 by bolts 5 (see FIG. 3).

With reference to FIGS. 1 and 2 on the support base 7 are mounted a transmitting gear 10 gearing into the driving pinion 25, a driven gear 11 gearing into the transmitting gear 10, and a driven pinion 11a which is concentrically and integrally formed with the driven gear 11. The driven pinion 11a gears into a spur gear 12 fixed to the lowermost of the lifting ram 2, so that the lifting ram 2 can move upward or downward depending on normal or reverse rotating direction of the servo motor 3.

Referring to FIG. 5 which is a schematic wiring diagram for this screw-type jack, the servo motor 3 is electrically connected to a cigaratte lighter receptacle of vehicle through a wiring 13 and a selector switch 15, so that the servo motor 3 can operate in normal or reverse direction depending upon a normal or reverse selection of the selector switch 15.

In lifting operation of this electrically operated screw-type jack, when the jack is positioned under the portion of the vehicle to be lifted and the selector switch 15 is then selected in lifting selection, the servo motor 3 can operate in the normal direction in order to drive the driving gear 3a, so that the first planetary gears 21a gearing into the driving gear 3a are driven. At this time, the sun gear cylinder 23 of which the geared inner surface 23' gears into the first planetary gears 21a can not rotate because its fitting projections 23a fit with the fitting recesses 31a of the clutch disk 31, in addition the fitting protrusions 31b of the disk 31 are received in the axial guide grooves 33b of the sleeve 33. Consequently, the rotation of the first planetary gears 21a results in rotation of the center gear 24 on which are mounted the gears 21a by the pins 24a. In turn, this also causes rotation of the second planetary gears 22a which gear into the center gear 24. Therefore, the driving pinion 25, on which are mounted the second planetary gears 25a, by the pins 25a can rotate in reduced speed. The rotation of the driving pinion 25 results in the rotation of the transmitting gear 10 which gears into the driving pinion 25, and then the rotation of the driven gear 11 gearing into the transmitting gear 10, also the rotation of the driven pinion 11a which is concentrically and integrally formed with the driven gear 11. Therefore, the spur gear 12 gearing into the driven pinion 11a rotates as a result of the rotation of the pinion 11a, so that the lifting ram 2 which is fixed to the spur gear 12 at its lower end moves upward so as to cause the lifting of the vehicle being loaded on a saddle 2a of the lifting ram 2. Furthermore, this screw-type jack can smoothly lift the vehicle to be lifted without any trouble by providing the speed reduction by means of the reduction gears 20.

On the other hand, in the lowering operation of the jack, the select switch is 15 placed in the lowering position in order to drive the servo motor 3 in the reverse direction. Consequently, all of the driving gear 3a, the first and second planetary gears 21a, 22a, driving pinion 25, the transmitting gear 10, the driven gear 11 and the driven pinion 11a sequentially rotate in the reverse direction. Therefore, the vehicle being loaded on the saddle 2a, and lifted by the jack, can lower as a result of the reverse rotations of the spur gear 12 and the downward movement of the lifting ram 2.

Also in a case that, in operating this jack, there may be an undesired overload on the jack. In this case, the driving power of the first and second planetary gears 21a, 22a drives the sun gear cylinder 23 to be forcedly rotated. This occurs instead of forces being transmitted to the driving pinion 25 which is in overload. The sun gear cylinder 23 is broken away from its state of engagement with the clutch disk 31. Therefore, there is an advantage that the servo motor 3 and the power transmitting gear elements can be prevented from failure even though there is an undesired overload on the jack in lifting operation.

When a lifting operation of the jack is abruptly stopped resulting from a failure of the servo motor or the gear elements, the square head pin 16 by which are mounted the driven gear 11 and driven pinion 11a on the support base 7 may be rotated by a hand tool, such as a spanner, in order to rotate the gear 11 and the pinion 11a and the spur gear 12, so that the lifting ram 2 can be lowered. As such, the vehicle can be removed from the jack through a lowering of the lifting ram 2 by manual manipulation of the pin 16.

It should be noted that, even though the two step reduction gears 20 comprise the first and second sun and planet gears 21, 22, it is a nonlimiting embodiment for description purposes only. Consequently, the steps of the reduction gears may be increased or reduced depending on a driving power of the servo motor and a lifting speed of the lifting ram.

As described in the above description, the electrically operated screw-type jack in accordance with this invention can considerably promote the driving power of the servo motor by being provided with the reduction gears having the first and second sun and planet gears and the sun gear cylinder, also prevent its servo motor and power transmitting elements from failures, when there is an undesired overload on it, by being provided with the sun gear cylinder of the reduction gears and the safety device, having clutch disk and the clutch spring, in which the clutch disk may be disengaged from the sun gear cylinder in overloading the jack in order that the sun gear cylinder. Furthermore, there is an advantage that the vehicle can be safely lowered by hand manipulating the square head pin by which the driven gear and the driven pinion are mounted on the support base.

With the invention is thus explained, it is apparent that various variations and modifications can be made without departing from the scope of the invention. It is therefore intended that the invention be limited as indicated in the appended claims.

What is claimed is:

1. A screw-type jack comprising:
   a support base;
   a jack body mounted on said support base;
   a housing mounted on said jack body, said housing having a flange formed at a middle portion thereof;
   a servo motor having a driving gear mounted to a lower end thereof, said servo motor being contained in said housing;
   a lifting ram vertically mounted on said support base, said lifting ram being contained in said jack body;
   a driven gear and a driven pinion mounted on said support base, said driven gear and said driven pinion in engagement with each other;
   reduction gears having first sun and planet gears including first planet gears and a center gear, second sun and planet gears including second planetary gears and a driving pinion, a sun gear cylinder housing said first and second sun and planet gears therein, said sun gear cylinder having fitting projections formed at lower end thereof;
   a safety device mounted under said reduction gears, and having a clutch disk on which are formed fitting recesses, said fitting recesses disengagably receiving said fitting projections of said sun gear cylinder;
   a clutch spring resiliently supporting said clutch disk in engagement with said lower end of said sun gear cylinder; and
   a sleeve mounted detachably to said flange of the housing by bolts, said sleeve having a cylindrical support formed at the bottom thereof, said sleeve and said cylindrical support housing said reduction gears and said safety device therein.

2. A screw-type jack as claimed in claim 1, wherein said driving pinion having an engaging flanged end for being seated on the top end of said cylindrical support.

3. A screw-type jack as claimed in claim 1, wherein said fitting projections of the sun gear cylinder and said fitting recesses of the clutch disk having slants formed at both sides thereof, respectively.

4. A screw-type jack as claimed in claim 1, further comprising a square head pin having a square head extending out of said jack body, said square head pin, mounting said driven gear and said driven pinion on said support base, said square head pin engaging one of said driven gear and said driven pinion such that a rotation of said square head causes a rotation of said driven gear.

* * * * *